UNITED STATES PATENT OFFICE.

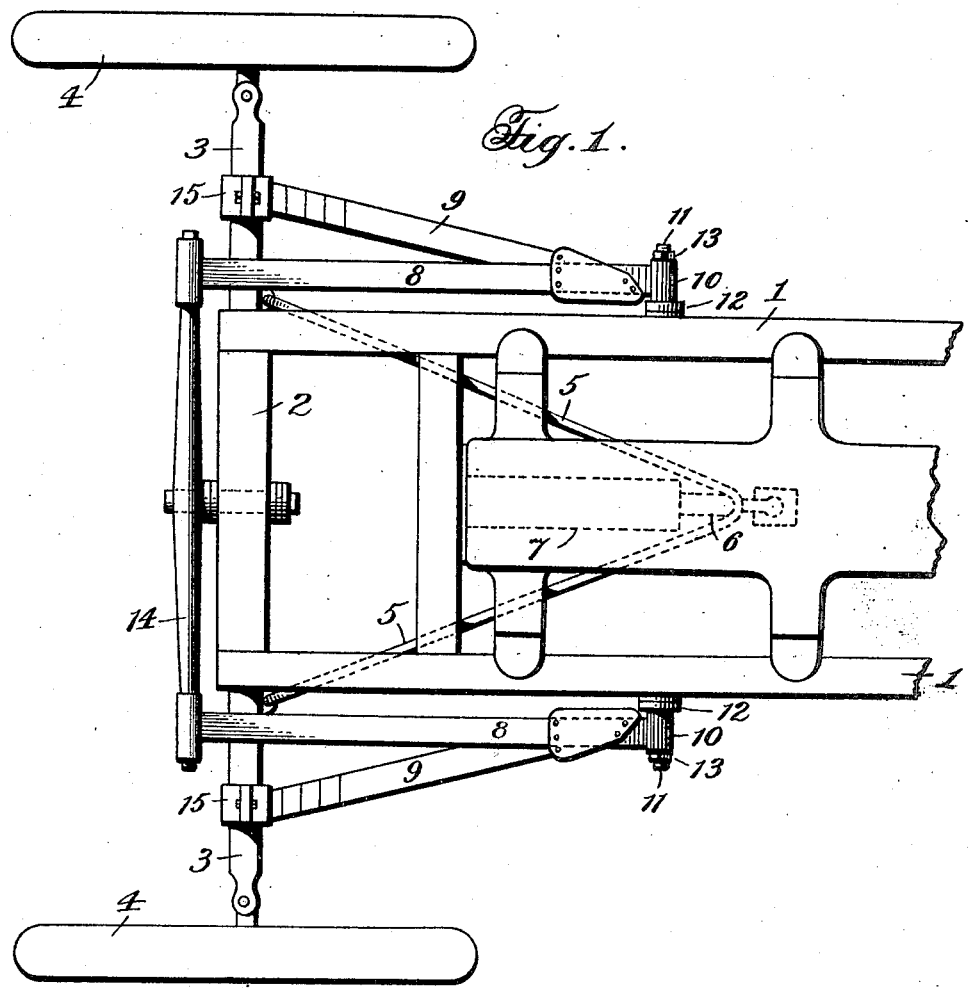

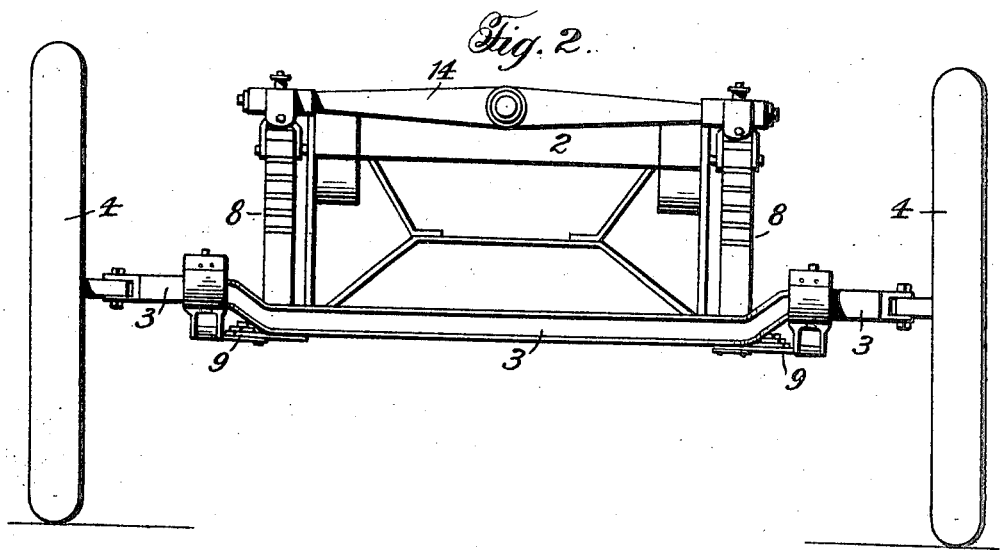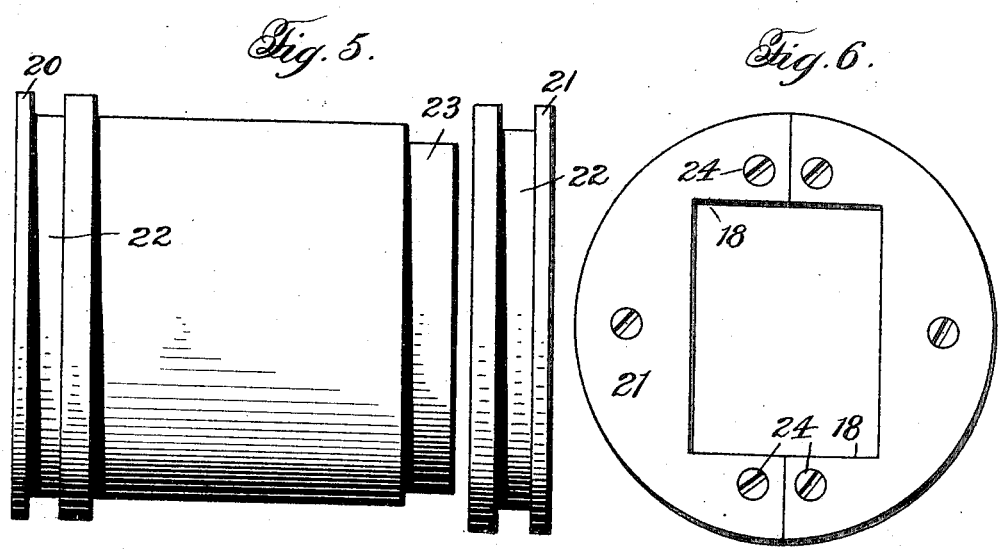

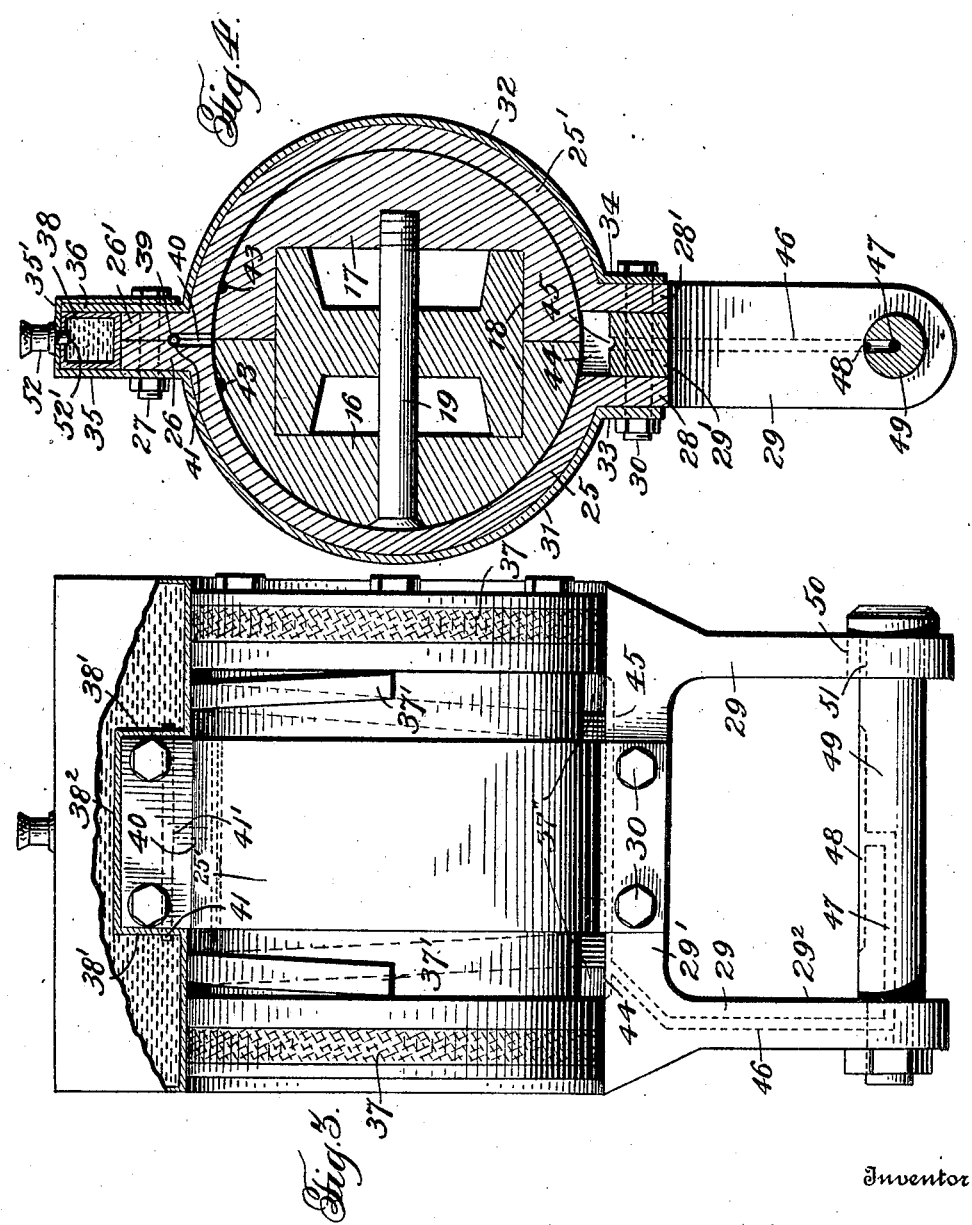

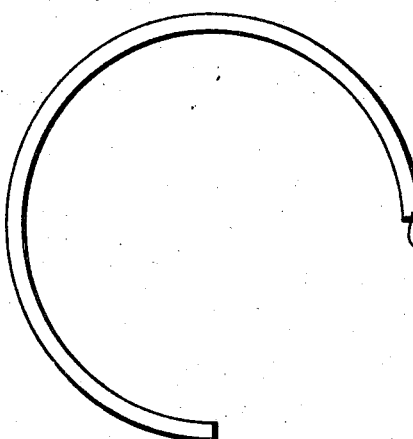
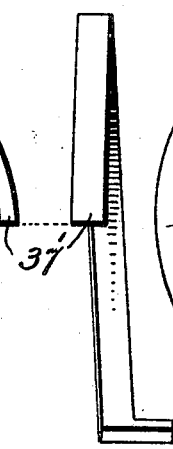
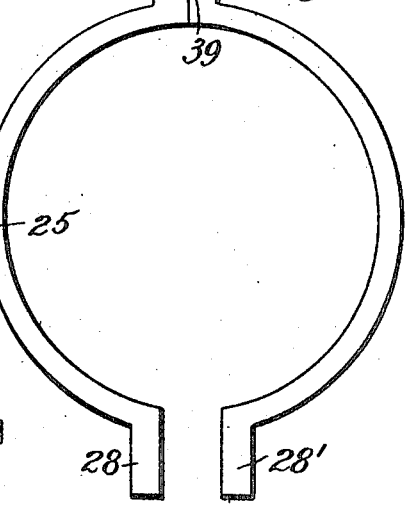
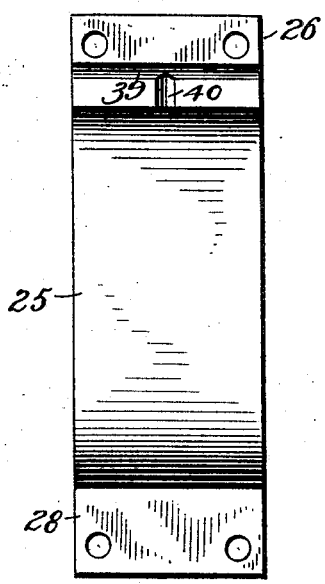
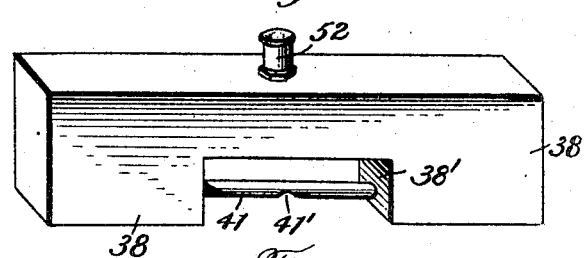
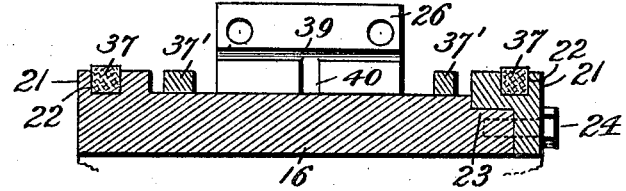

STEPHEN LEONARD CHAUNCEY COLEMAN, OF FREDERICTON, NEW BRUNSWICK, CANADA, ASSIGNOR OF FORTY-NINE ONE-HUNDREDTHS TO CHARLES W. WHELPLEY, OF FREDERICTON, NEW BRUNSWICK, CANADA.

VEHICLE SUSPENSION.

1,323,453. Specification of Letters Patent. Patented Dec. 2, 1919.

Original application filed September 13, 1916, Serial No. 119,934. Divided and this application filed November 22, 1917. Serial No. 203,456.

*To all whom it may concern:*

Be it known that I, STEPHEN LEONARD CHAUNCEY COLEMAN, a subject of the King of Great Britain, residing at Fredericton, in the county of York, Province of New Brunswick, and Dominion of Canada, have invented certain new and useful Improvements in Vehicle Suspensions, of which the following is a specification, reference being had therein to the accompanying drawing.

This invention relates to improvements in vehicle spring suspension, the subject matter of this application being a division of an application filed by me September 13, 1916, Serial No. 119,934.

The object of the invention is to provide an improved vehicle spring suspension that provides for the cushioning of the axles against lateral shocks and that will prevent or reduce the transmission to the vehicle body of lateral shocks due to the wheels of the vehicle striking ruts, skidding of the vehicle, and tendency of the axles to shift laterally.

Another object of the invention is to provide an improved shackle connection for the springs that permits of a long longitudinal movement of the springs with a relatively short shackle loop, allowing the springs to be hung close to the axle, and also permits of a certain amount of side play of the springs during their lengthening and shortening movement.

A further object of the invention is to provide an improved shackle of this nature of simple, inexpensive, compact construction, in which the bearing sleeves will be protected from dirt and dust, and provision made for the thorough lubrication thereof throughout the same.

A still further object of the invention is to provide an improved shackle of the character referred to that can be easily secured in place on the axle of the vehicle.

The invention, with other objects and advantages thereof, and the particular construction, combination and arrangement of parts comprising the same will be understood from the hereinafter contained detail description when considered in connection with the accompanying drawings forming part hereof and illustrating one embodiment of the invention.

In the drawings:

Figure 1 is a top plan view showing a motor vehicle equipped with a spring suspension in accordance with the present invention, only one end of the vehicle frame being illustrated.

Fig. 2 is an end elevation, the radius rods, piston rod, and spring cushioning device being left out for the sake of clearness.

Fig. 3 is a side elevation, on an enlarged scale, of the shackle parts being shown in section.

Fig. 4 is a central transverse section of the construction illustrated in Fig. 2.

Fig. 5 is a detail side elevation of the main bearing member of the shackle.

Fig. 6 is an end elevation of the flange of one end of the main bearing member of the shackle.

Figs. 7 and 8 are detail views of the cushioning means.

Fig. 9 is a detail end elevation of the shackle band.

Fig. 10 is a detail side elevation of one of the members of the shackle band.

Fig. 11 is a detail of the lubricant container.

Fig. 12 is a detail sectional view with certain of the parts removed.

Referring to a detail description of the drawings, wherein like reference characters designate corresponding parts throughout the several views, 1 designates side bars, and 2 an end bar of the vehicle supporting frame or chassis, 3 an axle and 4 the wheels. Referring particularly to Fig. 1 of the drawings the axle is shown as supported for longitudinal cushioning movement, the same being connected by radius rods 5, to piston rod 6 of a spring cushioning device 7, which may be of any approved construction. At the end of the frame at each side thereof are longitudinally disposed springs, each consisting of a pair of leaf spring members 8—9, that have their butt ends secured together and pivotally connected to the side bars 1 of the frame, the springs having bearing sleeves 10 engaging pivot bolts 11, and being maintained in position on the pivot bolts against lateral movement by washers 12 at the inner end of the bolts and nuts 13. The upper members 8 of the springs are connected at their outer ends to opposite ends of an equalizer lever 14 that is pivoted intermediate its ends to the end bar 2 of the vehicle supporting frame.

A cushioned lateral sliding connection is provided between the springs and the axle which permits of a limited amount of lateral play or movement of the axle and springs relative to each other. The connections between the springs and axle are provided by shackles designated as a whole by 15. Each shackle comprises an annular bearing made up of semi-cylindrical members 16—17, having rectangular shaped recesses 18 at their inner sides to fit about the axle, said sections being clamped together and secured to the axle by a transversely extending fastening member 19. The bearing at opposite ends has annular flanges 20—21 formed with grooves 22, the flange 21 at one side of the bearing being detachable, the sections of this flange fitting over reduced portions 23 of the members and being secured thereto by screws 24. Mounted upon the bearing for rotation and to slide laterally thereon between the flanges 20—21 is a band consisting of two semi-circular sections 25—25′ provided at their upper ends with extensions 26—26′ clamped together by bolts 27, and having at their lower ends spaced extensions 28—28′. 29 designates the shackle loop, the upper cross bar 29′ of which is rigidly secured to the shackle band between the extensions 28—28′ by bolts 30. On the bearing at each side of the shackle band is provided cushioning means. The cushioning means, in the present instance, takes the form of heavy coiled spring washers 37′, which are interposed between opposite sides of the shackle band and opposite flanges 20—21, said spring washers acting to normally maintain the shackle band centrally of the bearing between the flanges and yieldably resisting lateral movement of the band and the axle relative to each other. The spring washers 37′ at their inner sides are provided with lateral projections $37^2$ fitting between the extensions 28—28′ of the sections 25—25′ of the band to prevent the washers 37′ from turning, as a whole, relatively to the band.

A casing is provided consisting of two plates or sections, having oppositely disposed curved portions 31—32, lower straight portions 33—34 fitting against the lower extensions 28—28′ of the band, and upper straight portions 35—36 fitting against the upper extensions 26—26′ of the band. The upper straight portions 35—36 extend above the extensions 26—26′, and one of said portions 35 is provided with a part 35′ extending laterally to the opposite straight portion 36 and overlapping the same. The straight portions 33—34 and 35—36 of the plates or sections are provided with openings for the passage of the bolts 27, the casing being secured in place on the band by said bolts. The casing extends well to the ends of the bearing over the flanges 20—21 and beyond the grooves 22 in which are seated rings 37 of felt or the like, the casing fitting close against the outer faces of said rings 37 which project beyond the outer faces of the end flanges 20—21, the casing completely inclosing the bearing band at the sides and top and serving to exclude dirt from the bearing and to retain lubricant thereabout. Located within the space between the upper straight portions 35—36 at the top of the casing is an oil reservoir 38, which is substantially U-shaped in form having side portions 38′ and the intermediate portion $38^2$, said oil reservoir fitting around the upper extensions 26—26′ of the band and being thus held against movement longitudinally of the casing. The opposite faces of the extensions 26—26′ are grooved to provide a longitudinally extending recess 39 and a centrally located transverse duct 40 extending from the longitudinal recess to the top of the bearing. 41 is a feed pipe positioned in the longitudinal recess 39 and connecting with the side portions 38′ of the reservoir. This feed pipe 41 has an opening 41′ at its underside centrally of its ends which opening adjoins the upper end of the transverse duct 40 so that oil from the reservoir will be conveyed by the feed pipe and the duct 40 to the top of the bearing. In the upper face of the bearing are provided longitudinal grooves 43 said grooves being located at the top part of the bearing so that during the oscillation of the shackle band the transverse duct 40 will be brought opposite to said grooves and a quantity of oil will be supplied to the grooves. The lubricant collects at the bottom of the bearing in the chamber 44. In the upper face of the cross bar 29′ of the shackle loop that forms the lower wall of the chamber 44 is a longitudinally extending groove 45 which communicates with a passage 46 extending downwardly through one of the side bars $29^2$ of the shackle loop to a duct 47 which leads to a groove 48 in the outer face of the spring pivot bolt 49 at the lower end of the shackle loop, so that lubricant from the chamber 44 is conveyed to the bearing for the spring on said pivot bolt 49. In order to maintain the pivot bolt in position with the duct 47 thereof communicating with the passage 46 at the lower end of the shackle loop, said pivot bolt is provided with a feather 50 which engages a slot 51 in one arm of the shackle loop. 52 designates a detachable filler cup for the oil reservoir, said cup having a tube 52' extending through the casing and having a threaded engagement with the upper wall of the reservoir.

It will be observed that the construction hereinbefore described provides for the cushioning of the axles against lateral shocks, relieving the wheels from strain, and preventing or reducing the transmission of said shocks to the vehicle body. A long longitudinal movement of the springs, which is especially desirable when the axles are supported for longitudinal cushioning movement, is permitted with a relatively short shackle loop, allowing the springs to be hung close to the axles, and also provides for a certain amount of lateral play of the springs during their shortening and lengthening movement. The construction is of a very compact nature that can be readily connected to an axle and embodies means for maintaining the lubrication of the bearing and the protection of the same against the entrance of dust and dirt.

While I have illustrated in the drawings, by way of example a preferred embodiment of the invention, it is to be understood that changes and variations of the particular construction shown and the carrying out of the invention in other forms, as will appeal to those skilled in the art, and within the scope of the appended claims may be practised without departing from the spirit of the invention.

What I claim is:

1. In a vehicle spring suspension, the combination with a frame, an axle, and a spring disposed longitudinally of and connected with the frame, of a lateral sliding connection for the spring with the axle.

2. In a vehicle spring suspension, the combination with a frame, an axle, and a spring disposed longitudinally of and connected with the frame, of a lateral sliding connection between the spring and axle, and cushioning means at each side of said lateral sliding connection.

3. In a vehicle spring suspension, the combination with a frame, an axle and a spring disposed longitudinally of and connected at one end with the frame, of a lateral sliding connection between the other end of the spring and the axle.

4. In a vehicle spring suspension, the combination with a frame, an axle, and a spring disposed longitudinally of and connected to the frame, of a shackle connecting the spring to the axle, said shackle being mounted on the axle to slide laterally thereon.

5. In a vehicle spring suspension, the combination with a frame, an axle, and a spring disposed longitudinally of and connected to the frame, of a shackle connecting the spring to the axle, said shackle being mounted on the axle for rotation and to slide laterally thereon.

6. In a vehicle spring suspension, the combination of a frame and axle, a spring disposed longitudinally of the frame, said spring comprising a pair of leaf springs having their butt ends secured together and pivotally connected with the frame, the outer end of one of the leaf spring members being connected with the frame, and means connecting the outer end of the other leaf spring member with the axle, said means comprising a shackle slidable laterally on the axle.

7. In a vehicle spring suspension, the combination of a frame and axle, a spring disposed longitudinally of the frame, said spring comprising a pair of leaf springs having their butt ends secured together and pivotally connected with the frame, the outer end of one of the leaf spring members being connected with the frame, and means connecting the outer end of the other leaf spring member with the axle, said means comprising a shackle mounted for rotation and to slide laterally on the axle.

8. In a vehicle suspension, the combination with a frame, an axle, and a spring disposed longitudinally of and connected to the frame, of a shackle connecting the spring to the axle, the shackle being mounted on the axle to slide laterally thereon, and cushioning means at each side of the shackle.

9. A shackle for springs comprising a cylindrical bearing composed of separate sections, means for detachably securing the sections together, annular flanges at opposite ends of the bearing, one of the flanges being removable, a band mounted for movement on the bearing between the flanges, and a shackle loop secured to the band.

10. A shackle for springs comprising a cylindrical bearing composed of separate sections, means for detachably securing the sections together, annular flanges at opposite ends of the bearing, a band mounted for movement on the bearing between the flanges, said band being composed of separate sections detachably secured together, and a shackle loop secured to said band.

11. The combination with an axle, of a cylindrical bearing composed of separate sections, a fastening member for detachably securing the sections together and to the axle, a band mounted for rotation upon the bearing, and a shackle loop secured to the band.

12. The combination with an axle, of a shackle for springs comprising a cylindrical bearing composed of separate tubular sections, a screw bolt extending transversely through an opening in the axle and engaging openings in the bearing sections, said bolt serving to clamp the sections together about the axle and to secure the same to the axle against movement longitudinally thereof, a band mounted for rotation upon the bearing, and a shackle loop secured to the band.

13. A shackle for springs comprising a cylindrical bearing, annular flanges at the ends of the bearing, a band mounted on the bearing for lateral sliding movement, a shackle loop secured to the band, and yieldable means on the bearing at opposite sides of the band acting to normally maintain the band in a position centrally of the bearing.

14. A shackle for springs comprising a cylindrical bearing, annular flanges at the ends of the bearing, a band mounted on the bearing for lateral sliding movement, a shackle secured to the band, and coiled springs on the bearing interposed between opposite sides of the band and opposite end flanges.

15. A shackle for springs comprising a cylindrical bearing, annular flanges at opposite ends of the bearing, a band mounted for movement on the bearing between the flanges, a shackle loop connected to the band, and an outer casing secured to said band inclosing the band and bearing at the sides and top thereof.

16. A shackle for springs comprising a cylindrical bearing, annular flanges at opposite ends of the bearing, said flanges being provided with annular grooves in the outer faces thereof, packing rings seated in the said grooves and projecting beyond the outer faces of the flanges, a band mounted for movement on the bearing between the flanges, a shackle loop connected to the band, and an inclosing casing detachably secured to the band, said casing extending over the end flanges and fitting against the outer faces of the packing rings.

17. A shackle for springs comprising a cylindrical bearing, a band mounted for rotation upon the bearing, a shackle loop secured to the band, and an oil reservoir carried by the band, said bearing provided with a groove in its outer face, said shackle having an oil duct leading through the band to the bearing and adapted to be brought into communication with the groove in the bearing during the oscillatory movement of the band.

18. A shackle for springs comprising a cylindrical bearing, a band mounted for rotation upon the bearing, and a shackle loop connected to the band, said shackle loop having a pivot bolt provided with a groove in its outer face, said shackle having an oil conduit leading from the bearing to the groove in the outer face of said pivot bolt.

19. A shackle for springs comprising a cylindrical bearing, a band mounted for rotation upon the bearing, said band having a substantially rectangularly shaped portion extending from the upper side thereof, a shackle loop connected to the band, an outer casing having oppositely disposed curved portions and straight portions at their upper ends fitting against the rectangularly shaped portion of the band at opposite sides thereof and extending above the same and a substantially U-shaped reservoir located between said straight portions of the casing and fitting around the rectangularly shaped portion of the band, said shackle having an oil conduit leading from the reservoir to the outer face of the bearing.

20. A shackle for springs comprising a cylindrical bearing, a band mounted for rotation upon the bearing, said band having a substantially rectangularly shaped portion extending from the upper side thereof, a shackle loop connected to the band, an outer casing composed of two oppositely disposed plates having curved portions and straight portions at their upper ends fitting against the rectangularly shaped portion of the band at opposite sides thereof and extending above the same, a substantially U-shaped reservoir located between said straight portions of the casing and fitting around the rectangularly shaped portion of the band, the rectangularly shaped portion of the band being provided with a recess extending longitudinally thereof, a feed pipe located in the said recess and provided with an outlet opening intermediate its ends, and a conduit leading from the outlet of the feed pipe to the outer face of the bearing.

21. In a vehicle suspension, the combination with a frame, an axle, and a spring disposed longitudinally of and connected with the frame, of a shackle connecting the spring to the axle, said shackle being mounted on the axle to slide laterally thereon, and means for limiting the lateral movement of the shackle.

22. In a vehicle suspension, the combination with a frame, an axle, and a spring disposed longitudinally of and connected with the frame, of a shackle connecting the spring to the axle, said shackle being mounted upon the axle to slide laterally thereon, and means yieldably resisting lateral movement of the shackle.

23. In a vehicle suspension, the combination with a frame, an axle, and a suspension member disposed longitudinally of and connected with the frame, of a laterally sliding connection for the suspension member with the axle, and cushioning means between the axle and said sliding connection.

24. A shackle for springs comprising a cylindrical bearing composed of separate sections, means for detachably securing the sections together, a band mounted for movement on the bearing, and a shackle loop secured to said band.

25. A shackle for springs, comprising a cylindrical bearing, a band mounted on the bearing to slide laterally thereon, portions at opposite ends of the bearing to limit the lateral movement of the band, and a shackle loop secured to the band.

26. A shackle for springs comprising a cylindrical bearing, a band mounted for rotation upon the bearing, a shackle loop secured to the band, an oil reservoir mounted upon the band, and an oil conduit leading from the oil reservoir to the bearing.

In testimony whereof I hereunto affix my signature in the presence of two witnesses.

STEPHEN LEONARD CHAUNCEY COLEMAN.

Witnesses:
  L. A. JANETT,
  HARRIS G. FENETY.